United States Patent [19]

Okita

[11] Patent Number: 4,613,968
[45] Date of Patent: Sep. 23, 1986

[54] DISK DRIVE MECHANISM
[75] Inventor: Masao Okita, Furukawa, Japan
[73] Assignee: Alps Electric Co., Ltd., Japan
[21] Appl. No.: 714,374
[22] Filed: Mar. 21, 1985
[30] Foreign Application Priority Data
  Mar. 21, 1984 [JP] Japan .............................. 59-39071[U]
[51] Int. Cl.[4] .......................... G11B 5/16; G11B 3/62
[52] U.S. Cl. ..................................... 369/270; 360/97;
  369/261
[58] Field of Search ............... 369/270, 271, 290, 292,
  369/261; 360/97, 133

[56]  References Cited
  U.S. PATENT DOCUMENTS 3,768,815 10/1973 Mathurin .............................. 346/137
  4,358,803 11/1982 Van Der Giessen .................. 360/99
  4,403,319  9/1983 Adamek et al. ...................... 369/270

Primary Examiner—Steven L. Stephan
Attorney, Agent, or Firm—Guy W. Shoup

[57] ABSTRACT

A disk drive mechanism includes a spindle mounted on a motor-driven shaft and including an annular wall having a support surface, a flexible hub mounted on the motor-driven shaft and composed of a plurality of segments including a radially outward flange, the support surface and the segments coacting to center a floppy disk with respect to the motor-driven shaft, the support surface and the radially outward flange coacting to clamp the floppy disk therebetween, a collet mounted on the motor-driven shaft in fitting relation to the flexible hub and having a radially outward flange having a circumferential surface, and a resilient O-ring interposed between a surface of the flange of the flexible hub and the circumferential surface of the collet.

2 Claims, 5 Drawing Figures

DISK DRIVE MECHANISM

BACKGROUND OF THE INVENTION

The present invention relates to a disk drive mechanism, and more particularly to a disk drive mechanism for centering and clamping a disk (hereinafter referred to as a "floppy disk") such as a flexible disk cartridge or a floppy disk in a disk drive unit.

One conventional disk drive mechanism will be described with reference to FIGS. 1 and 2. A spindle 2 is coupled to a motor shaft 1 rotatably suppported by a frame 13 and has an annular wall 2a on which there is disposed a flexible hub 4 supported by a support post 3 and composed of a plurality of segments 4a. A collet 5 is positioned concentrically on and above the flexible hub 4 with a spring 6 interposed therebetween. A holder plate 9 is disposed around the support post 3 and above the collet 5 with a spring 8 interposed between a washer 10 held against the plate 9 and an oilless bearing 7 coupled with the collet 5. The components disposed on and around the support post 3 are retained in place against removal by an E-washer or -retaining ring 11.

The portion encircled by A in FIG. 1 is shown at an enlarged scale in FIG. 2. As shown in FIG. 2, when the parts on the support post 3 are depressed into the spindle 2, an outer lower tapered portion 5a of the collect 5 abuts against and spreads an inner lower tapered portion 4a of the hub 4 to center a floppy disk 12 on an upper surface of the annular wall 2a of the spindle 2 and also to clamp the floppy disk 12 between a radially outward flange 4b of the hub 4 and the upper surface of the annular wall 2a.

With the conventional mechanism of the foregoing construction and operation, the tapered portions of the collet 5 and the hub 4, which are rigid bodies, are brought into interfitting engagement, and, due to their dimensional variations, no uniform pressure is imposed on the segments 4a of the hub 4 and the spindle 2. Therefore, the floppy disk 12 is not stably centered and clamped in position. Since the tapered interfitting portions are positioned below the surfaces which clamp the floppy disk 12, the segments 4a are tilted inwardly thereby reducing the centering accuracy. Ideally, the floppy disk 12 should first be centered and then clamped. With the prior arrangement, however, the floppy disk 12 is centered and clamped at the same time, resulting in a poor centering accuracy.

SUMMARY OF THE INVENTION

It is an object of the present invention to provide a disk drive mechanism capable of centering a floppy disk with increased accuracy and clamping the floppy disk with a stable clamping force.

To achieve the above object, a disk drive mechanism according to the present invention includes a resilient O-ring interposed between an upper circumferential surface of a flexible hub and a lower circumferential surface of a collet fitted in the flexible hub.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
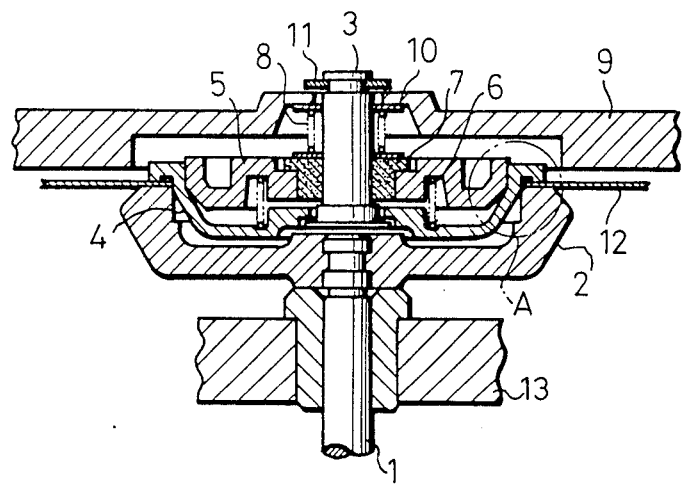
FIG. 1 is a cross-sectional view of a conventional disk drive mechanism.
Figure 2:
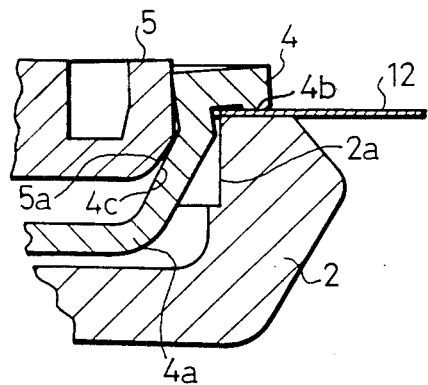
FIG. 2 is an enlarged fragmentary cross-sectional view of a portion of the conventional disk drive mechanism.
Figure 3:
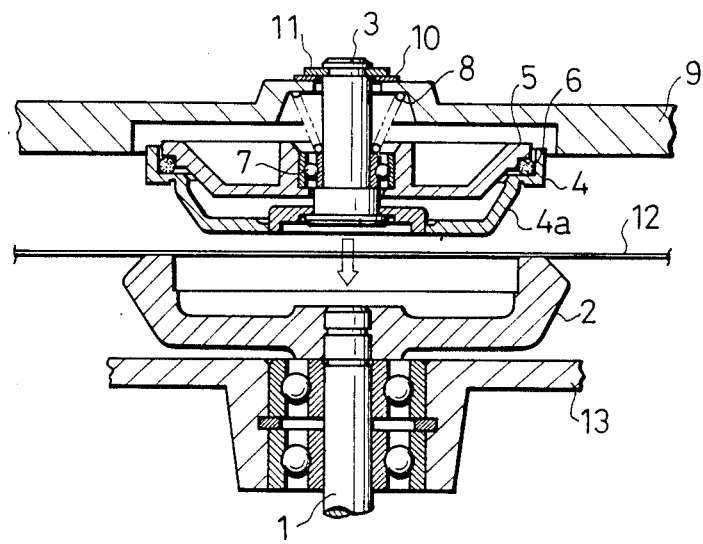
FIG. 3 is a cross-sectional view of a disk drive mechanism accordihg to the present invention.

A disk drive mechanism according to the present invention will be described with reference to FIGS. 3 through 5. Identical or corresponding parts in FIGS. 3 through 5 are denoted by identical or corresponding reference characters in FIGS. 1 and 2.

A spindle 2 is coupled to a motor shaft 1 rotatably supported by a frame 13 and has an annular wall 2a on which there is disposed a flexible hub 4 supported by a support post 3 and composed of a plurality of, e.g. six or eight, segments 4a. A collet 5 is disposed around the support post 3 with a bearing 7 therebetween, and above the flexible hub 4. A resilient O-ring 6 is interposed between a lower circumferential surface 5a of the collet 5 and an upper circumferential surface 4c of the hub 4. A holder plate 9 is disposed around the support post 3 and above the collet 5 with a spring 8 interposed between the plate 9 and the bearing 7. The components disposed on and around the support post 3 are retained in place against removal by an E-washer or -retaining ring 11. Another washer 10 is interposed between an upper surface of the holder plate 9 and the E-washer 11. Designated at 12 is a floppy disk to be driven which is placed on an upper surface of the annular wall 2a of the spindle 2.

Figure 4:
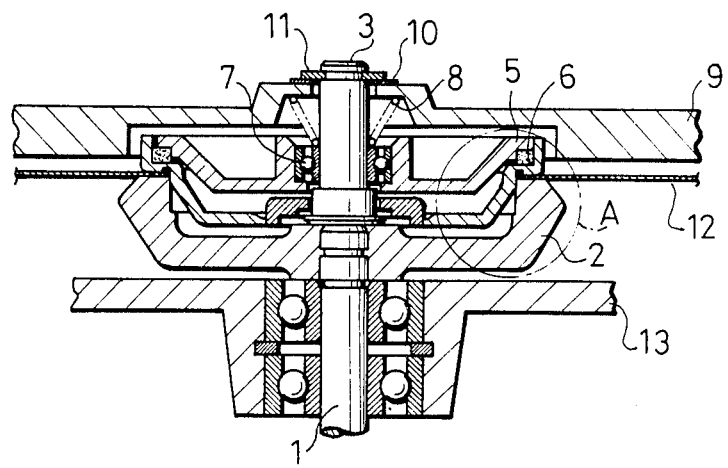
FIG. 4 is a cross-sectional view of the disk drive mechanism of FIG. 3, showing the position of the parts in which a floppy disk is clamped.
Figure 5:
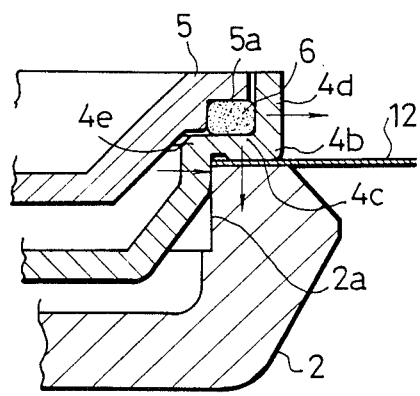
FIG. 5 is an enlarged fragmentary cross-sectional view of a portion encircled by a circle A in FIG. 4.

FIG. 4 shows the position of the parts in which the floppy disk 12 is clamped in place. The portion encircled by A in FIG. 4 is shown at an enlarged scale in FIG. 5. As shown in FIG. 5, when the holder plate 9 is depressed, clamping pressure from the holder plate 9 is applied through the spring 8 to the collet 5, the O-ring 6, and the hub 4. At the same time that the clamping pressure is imposed by the O-ring 6 on the hub 4, an outer circumferential flange or edge is spread radially outwardly to force a fitting portion 4e of the hub 4 into close contact with the annular wall 2a of the spindle 2 for thereby centering the floppy disk 12. As the holder plate 9 is further depressed, the floppy disk 12 is clamped between an upper surface of the annular wall 2a of the spindle 2 and a radially outward flange 4b of the flexible hub 4. The directions of forces applied in the process of the above centering and clamping operation are indicated by arrows in FIG. 5.

With the above arrangement, since the resilient O-ring 6 is interposed bewteen the collet 5 which is a rigid body and the hub 4 which is also a rigid body, unwanted dimensional variations of the segments 4a of the hub 4 and the collet 5 are taken up by the O-ring 6 and uniform clamping and centering pressure is applied to the segments 4a. In addition, the points through which the forces are applied from the O-ring 6 on the hub 4 are located radially outwardly of a central hole in the floppy disk 12, and hence the fitting portions 4e of the segments 4a are prevented from being tilted radially inwardly, resulting in a greater centering accuracy. To allow the floppy disk 12 to be centered first and then clamped, the outside diameter of the fitting portion 4e of the hub 4 is selected to be slightly greater than the inside diameter of the O-ring 6, so that the fitting portion 4e will be slid into place against the annular wall 2a of the spindle 2 for centering the floppy disk 12 before it is clamped.

The disk drive mechanism of the invention is therefore constructed for first centering and then clamping the floppy disk. The disk drive mechanism can center the floppy disk with a high accuracy and clamp the same with a stable clamping force. The disk drive mechanism is furthermore simple in construction and composed of parts of simple shapes, can be mass-produced with ease, and hence can be manufactured inexpensively.

Although a certain preferred embodiment has been shown and described, it should be understood that many changes and modifications may be made therein without departing from the scope of the appended claims.

What is claimed is:

1. A disk drive mechanism comprising:
   (a) a motor-driven shaft;
   (b) a spindle mounted on said motor-driven shaft and including an annular wall having a support surface;
   (c) a flexible hub mounted on said motor-driven shaft and composed of a plurality of segments including a radially outward flange, said support surface and said segments coacting to center a floppy disk with respect to said motor-driven shaft, said support surface and said radially outward flange coacting to clamp the floppy disk therebetween;
   (d) a collet mounted on said motor-driven shaft in fitting relation to said flexible hub through a resilient O-ring and having a radially outward flange having a circumferential surface; and
   (e) the resilient O-ring interposed between a surface of said flange of said flexible hub and said circumferential surface of said collet.

2. A disk drive mechanism according to claim 1, wherein said segments have a fitting portion fittingly engageable with a radially inward surface of said annular wall.

* * * * *